(12) United States Patent
Jones et al.

(10) Patent No.: US 7,266,093 B2
(45) Date of Patent: Sep. 4, 2007

(54) METHOD AND ARRANGEMENT FOR AUTOMATIC FREQUENCY CORRECTION

(75) Inventors: Alan Edward Jones, Derry Hill (GB); Paul Howard, Bristol (GB); Robert Armstrong, Bath (GB)

(73) Assignee: IPWireless, Inc., San Bruno, CA (US)

( * ) Notice: Subject to any disclaimer, the term of this patent is extended or adjusted under 35 U.S.C. 154(b) by 1081 days.

(21) Appl. No.: 10/242,481

(22) Filed: Sep. 12, 2002

(65) Prior Publication Data

US 2003/0099206 A1 May 29, 2003

(30) Foreign Application Priority Data

Sep. 13, 2001 (GB) ................... 0122090.4

(51) Int. Cl.
*H04J 3/00* (2006.01)
(52) U.S. Cl. ....................... 370/280; 375/149
(58) Field of Classification Search ............. None
See application file for complete search history.

(56) References Cited

U.S. PATENT DOCUMENTS

| | | | | |
|---|---|---|---|---|
| 4,879,728 A * | 11/1989 | Tarallo | ............ | 375/324 |
| 5,678,215 A * | 10/1997 | Carsello | ............ | 455/265 |
| 5,751,776 A | 5/1998 | Shiino et al. | | |
| 6,278,727 B1 | 8/2001 | Yanagi | | |
| 6,320,917 B1 * | 11/2001 | Stott et al. | ............ | 375/344 |
| 6,628,926 B1 * | 9/2003 | van de Beek et al. | ......... | 455/75 |
| 6,801,567 B1 * | 10/2004 | Schmidl et al. | ............ | 375/149 |

FOREIGN PATENT DOCUMENTS

| | | |
|---|---|---|
| DE | 19933266 A1 | 11/2000 |
| DE | 10001854 A1 | 8/2001 |
| GB | 2170978 A | 8/1986 |
| GB | 2379840 A | 3/2003 |
| WO | WO-98/34357 A1 | 8/1998 |
| WO | WO-01/61880 A1 | 8/2001 |
| WO | WO-03/024045 A1 | 3/2003 |

OTHER PUBLICATIONS

Rapporteur: Chapman, Thomas. "3GPP TS 25.221—Physical channels and mapping of transport channels onto physical channels (TDD)," located at <http://www.3gpp.org/ftp/Specs/html-info/25221.htm>. First available Feb. 4, 1999; 3 pgs.
Search Report dated Apr. 10, 2002, for United Kingdom Patent Application Serial No. GB 0122090.4 filed on Sep. 13, 2001, 1 pg.
International Search Report mailed on Apr. 12, 2002, for PCT Patent Application No. PCT/GB02/04193 filed on Sep. 13, 2002, 3 pgs.

* cited by examiner

*Primary Examiner*—Chi Pham
*Assistant Examiner*—Phuc Tran
(74) *Attorney, Agent, or Firm*—Morrison & Foerster LLP

(57) ABSTRACT

A method and arrangement for automatic frequency correction in UTRA TDD mode, having a first stage (500) for frequency lock in idle mode, and a second stage (600) for receiving a channel estimate from beacon function ($mx_1$), receiving a channel estimate from at least one other physical channel ($mx_2$), and receiving output from a primary synchronisation code correlator ($mx_0$, $pc_1$, $pc_2$), and for producing therefrom signals (X,Y,N) for use in frequency correction. By utilising first and second partial correlation values ($pc_1$, $pc_2$) which are balanced, DC offset effects may be substantially removed. This provides the following advantage of significantly improving performance at low levels of SNR, and removal of DC offset effects provides immunity to DC offsets arising from imperfections in hardware.

12 Claims, 5 Drawing Sheets

METHOD AND ARRANGEMENT FOR AUTOMATIC FREQUENCY CORRECTION

FIELD OF THE INVENTION

This invention relates to wireless communication networks and particularly to UTRA (Universal Mobile Telephone System Terrestrial Radio Access) networks operating in TDD (Time Division Duplex) mode.

BACKGROUND OF THE INVENTION

In UTRA TDD mode the synchronization channel (SCH) has two functions. The primary function is to provide a signal that enables a 'UE' (user equipment, such as a wireless terminal) to search for and identify a 'Node B' (i.e, a wireless Base Station of a UMTS system). The secondary function is to provide sufficient information to allow a UE to demodulate a P-CCPCH (Primary Common Control Physical CHannel) transmission and obtain the system information, sent on the BCH (Broadcast Channel) transport channel which is carried by the P-CCPCH, needed in order to be able to communicate with the network. The physical channel P-CCPCH has the characteristics of the Beacon Function, as defined in the technical specification '3GPP TS 25.221' publicly available on the of the 3.sup.rd Generation Partnership Project.

There are two cases of SCH and P-CCPCH allocation as follows: 1. Case 1) SCH and P-CCPCH allocated in timeslot #k, where k=0 . . . 14 Case 2) SCH allocated in two timeslots: timeslot #k and timeslot #k+8, where k=0 . . . 6; P-CCPCH allocated in timeslot #k where timeslot #k is the k.sup.th timeslot. Due to this SCH scheme, the position of P-CCPCH is known from the SCH. The SCH consists of one real-valued primary synchronization code (PSC) and three complex secondary synchronization codes (SSCs), all of length 256 chips. The PSC is common for all Node Bs, but the SSCs are Node B specific. The PSC and SSC are transmitted simultaneously from a given Node B at a specific fixed time offset (t.sub.offset) from the start of the timeslot. The time offset is included to prevent the possible capture effect that would otherwise occur as a consequence of all Node Bs transmitting the common primary code at the same time.

Automatic Frequency Correction (AFC) is typically employed in UTRA TDD mode to correct for frequency offsets occurring in the presence of noise in the received signal. In UTRA TDD mode the PSC typically operates in negative values of SNR, which with conventional methods of AFC give rise to a large frequency offset, degrading performance.

A need therefore exists for frequency correction wherein the abovementioned disadvantage(s) may be alleviated.

STATEMENT OF INVENTION

In accordance with a first aspect of the present invention there is provided a method for automatic frequency correction in UTRA TDD mode, the method comprising: performing a frequency lock with a signal including received samples; and receiving a channel estimate from beacon function, receiving a channel estimate from at least one other physical channel, and receiving output from a primary synchronization code correlator, and for producing therefrom signals for use in frequency correction.

In accordance with a second aspect of the present invention there is provided an arrangement for automatic frequency correction in UTRA TDD mode, the arrangement comprising: means for performing a frequency lock with a signal including received samples; and means for receiving a channel estimate from beacon function, receiving a channel estimate from at least one other physical channel, and receiving output from a primary synchronization code correlator, and for producing therefrom signals for use in frequency correction.

BRIEF DESCRIPTION OF THE DRAWINGS

One method and arrangement for multistage frequency correction incorporating the present invention will now be described, by way of example only, with reference to the accompanying drawings, in which.

DESCRIPTION OF PREFERRED EMBODIMENTS

Figure 1:
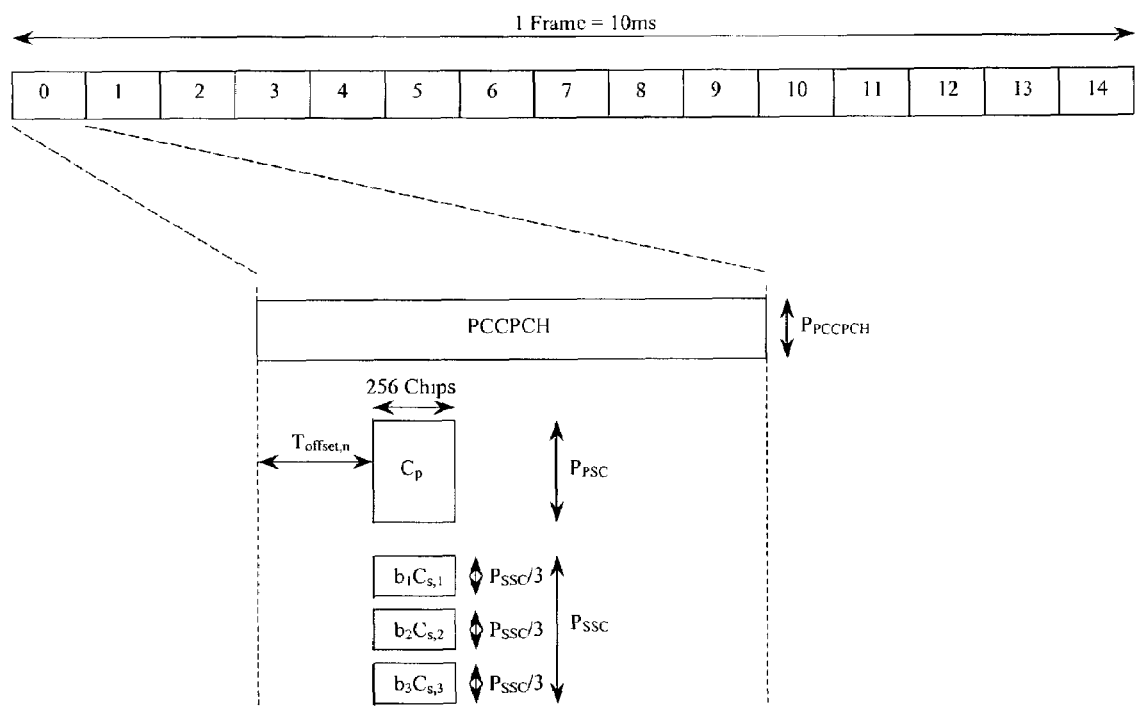
FIG. 1 shows in schematic form the format of SCH in UTRA TDD mode.

The general format of the SCH is shown schematically in FIG. 1. As shown, the primary synchronization code (PSC), $C_p$, is a real-valued sequence of length 256 chips, transmitted at power $P_{PSC}$. The secondary synchronization code (SSC), $C_{s,i}$ (i=1, 2, 3), of length 256 is transmitted simultaneously with the PSC; the total power of the SSC is set to $P_{SSC}$. In addition these codes are multiplied by a complex value, $b_j$ (j=1, 2, 3). The subscript s in $C_{s,i}$ refers to a code set, of which there 32, as specified in the technical specification '3GPP TS 25.223' publicly available on the website of the 3.sup.rd Generation Partnership Project. The code sets, s, in conjunction with the complex multiplier values, $b_j$, are used to transfer the information bits to the UE.

The location of the SCH relative to the beginning of the time slot is defined by $t_{offset,n}$. It is calculated as follows:

$$t_{offset,n} = \begin{cases} n.T_c \left\lfloor \frac{976-256}{15} \right\rfloor & n < 16 \\ \left( 976 + 512 + (n-16) \left\lfloor \frac{976-256}{15} \right\rfloor \right) T_c & n \geq 16 \end{cases}$$

which can be simplified to:

$$t_{offset,n} = \begin{cases} n.48.T_c & n < 16 \\ (720+n.48)T_c & n \geq 16 \end{cases}$$

where $T_c$ is the chip duration and n=0, 1, ..., 31. The value of n is related to the code group and is obtained by demodulating the information on the SSC.

The PSC, p, is constructed as a generalized hierarchial Golay sequence. The sequence used for p has been chosen to have good a periodic autocorrelation properties. Defining a sequence 'G' as G=[$g_1$ $g_2$ $g_3$ ... $g_{16}$]=[1 1 1 -1 -1 1 -1 -1 1 1 -1 -1 1 1]

and defining a sequence 'a' as a=[1 1 1 1 1 1 -1 -1 1 -1 1 -1 1 -1 -1 1]

the primary code sequence is obtained by spreading sequence 'G' by the sequence 'a', producing the resulting primary sequence given by p=(1+j).[$g_1$·a $g_2$·a $g_3$·a ... $g_{16}$·a]

Figure 2:
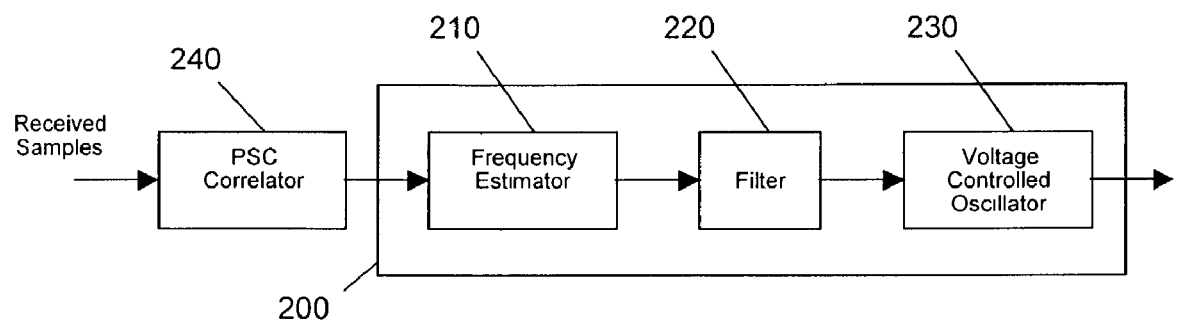
FIG. 2 shows in schematic form a prior art arrangement for Automatic Frequency Control in UTRA TDD mode.

Referring now to FIG. 2, a conventional Automatic Frequency Correction (AFC) system 200 consists of a frequency estimator 210, a filter 220, and a Voltage Controlled Oscillator (VCO) 230.

The received samples are applied to PSC correlator 240. The vector of received samples that produced the highest correlation peak are applied to the frequency estimator 210. Let r=($r_0$, ..., $r_{255}$) be the sequence of received samples that produce the highest complex peak at the output of PSC correlator, and p=($p_0$, ..., $p_{255}$) be the complex PSC. Then we can write r=p+n where n=($n_0$, ..., $n_{255}$) is a noise/interference vector with zero mean and variance $2\sigma^2$. In order to obtain an estimate of the frequency offset, we take partial correlations of the PSC such that $$pc_1 = \sum_{i=0}^{127} r_i p_i^*$$

$$pc_2 = \sum_{i=0}^{127} r_{i+128} p_{i+128}^*$$

where $pc_1$ and $pc_2$ are the result of 2 partial correlations of length 128. The phase difference between $pc_1$ and $pc_2$ is given by:

$C = pc_1 \times pc_2^*$ $$\Delta\phi = \tan^{-1}\left(\frac{\text{Im}(C)}{\text{Re}(C)}\right)$$

A look-up table generally provides the $\tan^{-1}(.)$ function. The instantaneous frequency offset is given by:

$$\Delta f_k = \frac{1}{2\pi}\frac{\Delta\phi}{dt} = \frac{1}{2\pi}\frac{\Delta\phi}{128 T_c} \text{Hz}$$

where $T_c$ is the chip period and 128 is the distance in chips between the correlation peaks $pc_1$ and $pc_2$. The instantaneous frequency offset is filtered to obtain an average value, and then applied to a Voltage Controlled Oscillator, which is adjusted to remove the frequency difference.

Considering the frequency estimator in more detail, and supposing there is no frequency offset, but Gaussian noise is present, then the output of the two partial correlators is given by $pc_1 = U_1 + N_1$ $pc_2 = U_2 + N_2$ where $U_1 = U_2 = 128$, $$N_1 = \sum_{i=0}^{127} n_i p_i^*$$

and $$N_2 = \sum_{i=0}^{127} n_{i+128} p_{i+128}^*.$$

The phase perturbation by the noise term is given by $C = (128^2 + 128(N_2^* + N_1))$ $$\Delta\phi = \tan^{-1}\left(\frac{[\text{Im}(N_2^* + N_1)]}{[\text{Re}(128 + N_2^* + N_1)]}\right)$$

We note the maximum phase perturbation occurs when $(N_2^* + N_1)$ is purely imaginary. We write $$\Delta\phi_{max} = \tan^{-1}\left(\frac{[\text{Im}(N_2^* + N_1)]}{128}\right)$$

Figure 3:
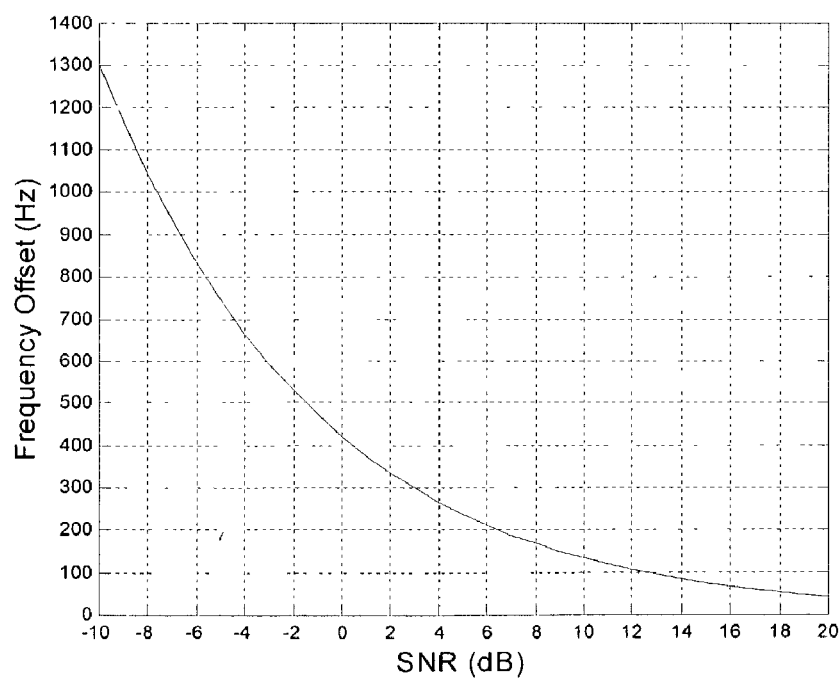
FIG. 3 shows a graphical representation of the Frequency Offset performance of the AFC arrangement of FIG. 2 as a function of Signal-to-Noise Ratio (SNR)

Recognising that the variance of the items inside the brackets yields $$\frac{E(|N_2^*|^2) + E(|N_1|^2)}{128^2} = \frac{2\sigma^2}{128}$$

we can rewrite the phase perturbation at the output of the partial correlator as $$\phi_{1,n} = \tan^{-1}\left(\frac{1}{\sqrt{128 \times SNR_{ip}}}\right)$$

where the SNR at the input to the partial correlator is given by $$SNR_{ip} = \frac{E(|p|^2)}{E(|n|^2)} = \frac{1}{2\sigma^2}$$

and the expectation operator, E(.), is taken over 128 chips. FIG. 3 shows the frequency offset generated for varying levels of $SNR_{ip}$. In UTRA TDD mode the PSC typically operates in negative values of SNR, which with the above-described conventional method of AFC gives rise to a large frequency offset, degrading performance.

The present invention proposes a method and arrangement for AFC in UTRA TDD mode which facilitates improved performance under low values of SNR.

Figure 4:
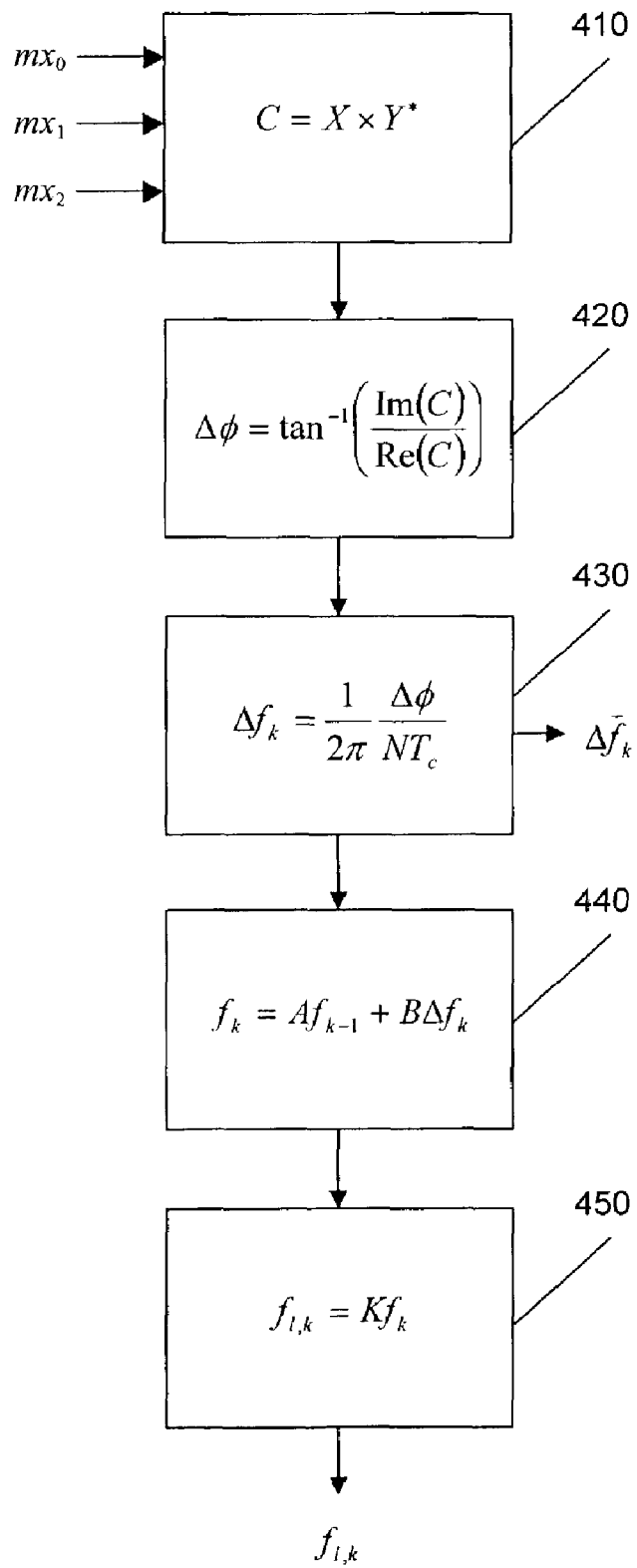
FIG. 4 shows in block schematic form the process flow of AFC employed in the present invention.

Referring now to FIG. 4, in a preferred embodiment of the invention AFC consists of two stages:

Stage 1—operated in Idle mode only
Stage 2—operated in Idle/Connected mode

The first stage is used to obtain fast acquisition, by initially using a wide bandwidth and then narrowing to suppress noise and interference. The second stage is used to further improve performance under severe noise conditions.

The analysis below utilizes the following variables:

$mx_0$: Complex peak from the output of the PSC correlator, $mx_1$: Complex peak from the output of the Beacon function channel estimator, and $mx_2$: Complex peak from the output of the channel estimator located in adjacent timeslot to the Beacon function (although the adjacent timeslot is used here it can be shown that other timeslot pairings also apply).

As shown in FIG. 4, the AFC algorithm is given by:

$$C = X \times Y^* \quad (410)$$

where X and Y $\in \{(pc_1, pc_2), (mx_2, mx_1), (mx_0, mx_1)\}$. An estimate of the phase difference is given by $$\Delta\phi = \tan^{-1}\left(\frac{\text{Im}(C)}{\text{Re}(C)}\right) \text{rads} \quad (420)$$

A look-up table can provide this function. The instantaneous frequency offset is given by:

$$\Delta f_k = \frac{1}{2\pi} \frac{\Delta\phi}{dt} = \frac{1}{2\pi} \frac{\Delta\phi}{NT_c} \text{Hz} \quad (430)$$

where N is the distance in chips between the X and Y samples and $T_c$ is the chip period. The running mean of the frequency offset is given by $$\Delta\bar{f}_k = \left|\sum_{i=1}^{k} \Delta f_i\right|$$

where the over-bar denotes mean value. The mean of the frequency offset is used to trigger certain events during initial synchronization. The instantaneous frequency offset is filtered, giving $$f_k = Af_{k-1} + B\Delta f_k \quad (440)$$

The output of the filter is multiplied by the loop gain constant K, yielding the output $$f_{l,k} = Kf_k \quad (450)$$

This output $f_{l,k}$ is subsequently applied to a single-bit DAC (not shown), which is used to derive a suitable voltage level for tuning the VCO.

AFC Stage 1

Figure 5:
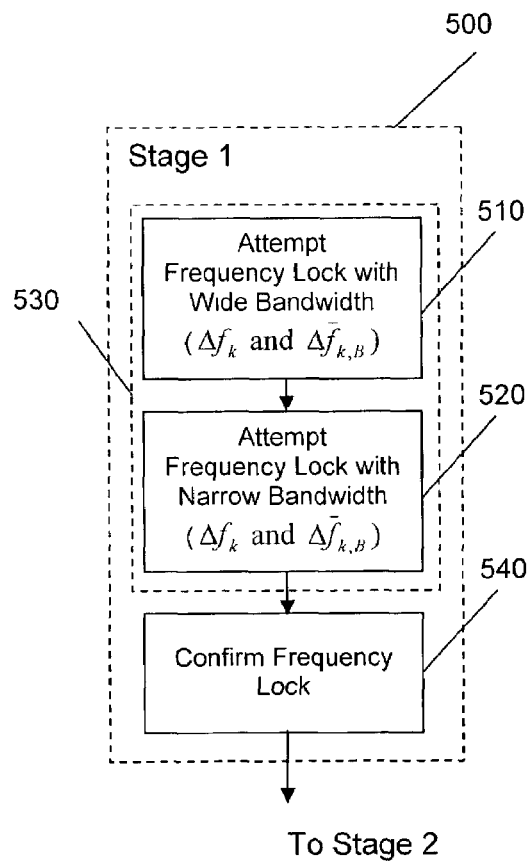
FIG. 5 shows in block schematic form a first stage in AFC employed in the present invention.

As shown is FIG. 5, two processes are implemented in Stage 1 (500):
  a) Bandwidth reduction (processes 510 and 520, shown together as 530), and
  b) Signalling of AFC lock (540) so Stage 2 can be entered.

Stage1/Process A

The UE is powered up and starts an initial cell search. Once Frame lock has been acquired, the UE attempts to achieve frequency lock with the Node B.

Let the first radio frame after frame lock be k=1, and the initial loop parameters are set to $X=pc_1$, $Y=pc_2$, N=128, in addition to ensure a quick acquisition time filter constants A and B and the loop gain K are set to:

$$A=\text{Wide\_1}, B=\text{Wide\_2}, K=\text{Wide\_3}$$

Where Wide_1, Wide_2, and Wide_3 have been chosen to ensure a wide bandwidth. After $N_B$ samples of $\Delta f_k$, the mean $\Delta\bar{f}_{k,B}$ is calculated. If $\Delta\bar{f}_{k,B}$ is less than a first predetermined value Set_Frequency1, the counter $N_A$ is incremented. Once $N_A$ has reached a specified value the loop gain and also the filter constants are updated to:

$$A=\text{Narrow\_1}, B=\text{Narrow\_2}, K=\text{Narrow\_3}$$

Where, Narrow_1, Narrow_2, and Narrow_3 have been chosen to ensure a narrow bandwidth. If $\Delta\bar{f}_{k,B}$ is greater than Set_Frequency1 the next value $\Delta A\bar{f}_{k+1}$ is calculated, and $\Delta A\bar{f}_{k+1,B}$ is calculated, repeating the above test. This process operates under a sliding window of span $N_B$ and is given by $$\Delta\bar{f}_{k,B} = \left|\sum_{i=k-N_B+1}^{k} \Delta f_i\right| : k \geq N_B$$

Process B can only be entered when the loop gain and filter constants have been updated in Process A.

Stage1/Process B

This process is used to signal that AFC lock has been acquired. $N_A$ is reset to 0 and $N_B+\Delta$ is considered to be the number of samples required to trigger the Process 1, where $\Delta$ is additional samples. After $N_B+\Delta+N_L$ samples, $\Delta A\bar{f}_k$ is calculated across a range of $N_L$. This is given by $$\Delta\bar{f}_k = \left|\sum_{i=k-N_L+1}^{k} \Delta f_i\right| : k \geq N_B + \Delta + 2N_L$$

When $\Delta\bar{f}_k$ is less than a second predetermined value Set_Frequency2, the counter $N_A$ is incremented. Stage 1 is exited when $N_A$ reaches a specified value that signifies AFC lock has occurred.

AFC Stage 2

Figure 6:
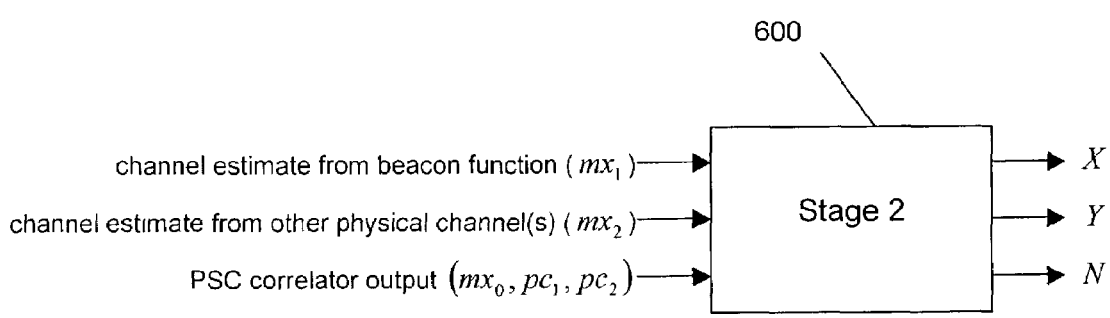
FIG. 6 shows in block schematic form a second stage in AFC employed in the present invention.

Referring now also to FIG. 6, when Stage 1 has been exited the UE will attempt to demodulate the SSC to determine the cell time offset. Once the UE is aware of the cell time offset, it will attempt to demodulate the beacon function on every radio frame. Similarly, once the UE moves from idle mode into connected mode channel estimate information may be available from other physical channels.

Therefore, in connected mode the UE should have at its disposal the channel estimate from the beacon function ($mx_1$), the channel estimate from other physical channels, for example the adjacent timeslot to the Beacon function ($mx_2$), and the output of the PSC correlator ($mx_0$, $pc_1$, $pc_2$). The algorithm for Stage 2 (600) is given by If $\Delta A\hat{f}_k<$Set_Frequency2
  If $mx_1>0$ & $mx_2>0$
    X=$mx_2$
    Y=$mx_1$
    N=−2560
  elseif $mx_1>0$
    X=$mx_0$
    Y $mx_1$ $$N = \left(1261 - \left(\frac{T_{offset,n}}{T_c} + 128\right)\right)$$

else
    X=$pc_1$
    Y=$pc_2$
    N=128
  end
else
  X=$pc_1$
  Y=$pc_2$
  N=128
end Essentially, the quality of the estimate degrades as we move through the control flow, the best estimate being given by $mx_1$ and $mx_2$. The mean of the frequency estimate is continually examined in order to detect any sudden frequency changes. This is achieved by continually testing for Set_Frequency2, if this value is exceeded the partial correlations from the PSC are employed. When channel estimate information is used from other timeslots, we only use channel estimates from adjacent slots so as to prevent aliasing. The allowed timeslot pairings are given in the following table.

| Pairing | $mx_1$ | $mx_2$ |
| --- | --- | --- |
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |

The value of N is fixed at −2560 for any pairing, and only one estimate should be used per frame. If multiple pairings are available, then the average should be taken.

Figure 7:
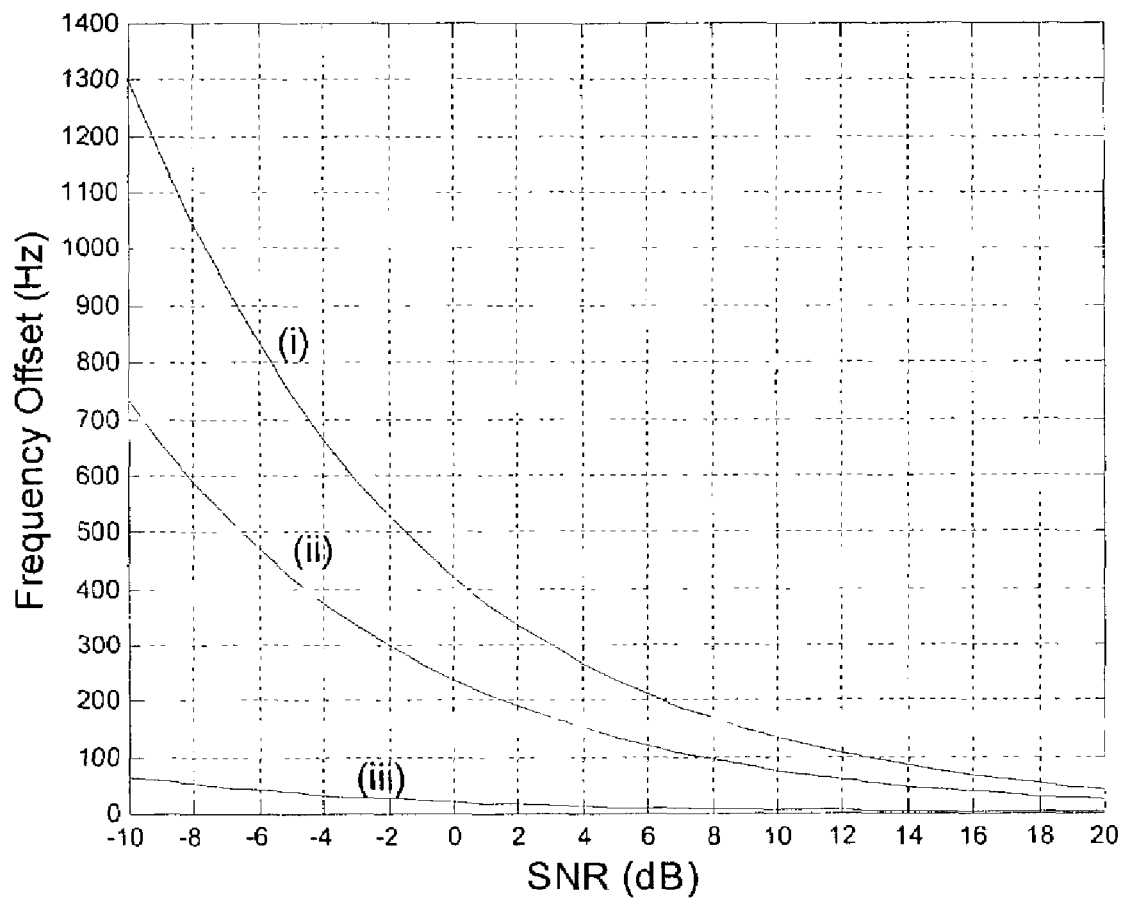
FIG. 7 shows a graphical representation of the Frequency Offset performance of the AFC arrangement of FIGS. 4, 5 & 6 as a function of Signal-to-Noise Ratio (SNR).

The improvement in SNR through AFC stage 2 is shown in the FIG. 7, in which three different cases (i), (ii) and (iii) are compared:

(i) Conventional Method: X=$pc_1$, Y=$pc_2$, N=128
(ii) X=$mx_0$, Y=$mx_1$, n=16, N=413
(iii) X=$mx_2$, Y=$mx_1$, N=−2560

For case (ii) the improvement for the smallest value of N can be seen, which occurs when n=15.

As will be shown below, further improvement of the two-stage AFC process described above is possible to remove DC offset typically arising from imperfections in the hardware. DC removal is achieved in the following manner:

Suppose the discrete time received sequence is given by $$r=p+n+I_{dc}$$

where $I_{dc}$ is complex DC interference. If the sequence has a length of 128 chips, then we can write the autocorrelation function (ACF) at zero shift of $P_k$ as $$pc = \sum_{i=0}^{127} r_i p_i^*$$

Rewriting gives $$pc = \sum_{i=0}^{127} p_i p_i^* + \sum_{i=0}^{127} n_i p_i^* + I_{dc}\sum_{i=0}^{127} p_i^*$$

By designing the sequence such that the sum of the elements is zero the DC interference can be effectively removed, we have $$pc = \sum_{i=0}^{127} p_i p_i^* + \sum_{i=0}^{127} n_i p_i^*$$

Let $$\sum_{i=0}^{127} p_{i+\alpha 16} = 4 \times (1+j) \times \sum_{j=1}^{8} g_{j+\alpha}$$

where $\Sigma a=4$, and $\alpha=(0,1,\ldots,8)$. The sequence balance is given in the table below.

| $\alpha$ | Sequence Balance = $\sum_{j=1}^{8} g_{j+\alpha}$ |
| --- | --- |
| 0 | 0 |
| 1 | 0 |
| 2 | 0 |
| 3 | 0 |
| 4 | 0 |
| 5 | 2 |
| 6 | 0 |
| 7 | 2 |
| 8 | 4 |

By examining the above table we see that the conventional approach uses sequences $\alpha=(0,8)$ which gives the highest level of DC gain. We choose a=(0,6) which gives a pair of with maximum distance in terms of N. The modified partial correlations bercome $$pc_1 = \sum_{i=0}^{127} r_i p_i^*$$

-continued $$pc_2 = \sum_{i=0}^{127} r_{i+96} p^*_{i+96}$$

where the time shift of the second partial correlation has been reduced from 128 to 96 to ensure DC cancellation. In terms of frequency estimation, this means that N is also reduced from 128 to 96.

It will be appreciated that the method for automatic frequency control described above will typically be carried out in software running on a processor (not shown), and that the software may be provided as a computer program element carried on any suitable data carrier (not shown) such as a magnetic or optical computer disc.

It will be appreciated that the above described AFC method and arrangement are based on an improved AFC scheme for correction of frequency offsets in UTRA TDD mode.

It will be understood that the improved AFC scheme provides the following advantages: the multistage scheme for correction of frequency offsets in UTRA TDD mode allows operation under very high levels of noise, and is also immune to DC offsets arising from imperfections in the hardware.

The invention claimed is:

1. A method for automatic frequency correction in UTRA TDD mode, the method comprising:
    performing a frequency lock with a signal including received samples;
    receiving a channel estimate from a beacon function;
    receiving a channel estimate from at least one other physical channel;
    receiving output from a primary synchronization code correlator;
    producing therefrom signals for use in frequency correction; and
    applying said signals to a variable-frequency signal generator.

2. The method of claim 1, wherein performing a frequency lock comprises performing a frequency lock in idle mock.

3. The method of claim 1, wherein performing a frequency lock comprises:
    performing a first frequency lock at a relatively wide bandwidth; and
    performing a second frequency lock at a relatively narrow bandwidth.

4. The method of claim 1 wherein performing a frequency lock comprises confirming frequency lock.

5. The method of claim 1 wherein producing signals for use in frequency correction comprises utilizing first and second partial correlation values which are balanced so as to substantially remove DC offset effects.

6. An arrangement for automatic frequency correction in UTRA TDD mode, the arrangement comprising:
    means for performing a frequency lock with a signal including received samples;
    means for receiving a channel estimate from a beacon function, receiving a channel estimate from at least one other physical channel, receiving output from a primary synchronization code correlator, and producing therefrom signals for use in frequency correction.

7. The arrangement of claim 6, wherein the means for performing a frequency lock comprises means for performing a frequency lock in idle mode.

8. The arrangement of claim 6, wherein the means for performing a frequency lock comprises:
    means for performing a first frequency lock at a relatively wide bandwidth; and
    means for performing a second frequency lock at a relatively narrow bandwidth.

9. The arrangement of claim 6, wherein the means for performing a frequency lock comprises means for confirming frequency lock.

10. The arrangement of claim 6, wherein the means for producing signals for use in frequency correction comprises means for utilizing first and second partial correlation values which are balanced so as to substantially remove DC offset effects.

11. The arrangement of claim 6, wherein the arrangement resides in user equipment for use in a UMTS system.

12. A computer readable medium comprising computer program code for performing automatic frequency correction as claimed in claim 1.

* * * * *

UNITED STATES PATENT AND TRADEMARK OFFICE
CERTIFICATE OF CORRECTION

PATENT NO. : 7,266,093 B2
APPLICATION NO. : 10/242481
DATED : September 4, 2007
INVENTOR(S) : Alan E. Jones et al.

It is certified that error appears in the above-identified patent and that said Letters Patent is hereby corrected as shown below:

At Column 1, Line 45, Claim 2

Currently reads: "mock."

Should read:  --mode.--

Signed and Sealed this

Twenty-ninth Day of April, 2008

JON W. DUDAS
*Director of the United States Patent and Trademark Office*